United States Patent
Goyal et al.

(10) Patent No.: US 9,419,919 B2
(45) Date of Patent: Aug. 16, 2016

(54) VPC AUTO CONFIGURATION

(71) Applicant: Cisco Technology, Inc., San Jose, CA (US)

(72) Inventors: Ankur Goyal, Sunnyvale, CA (US); Manuwela Kanade, Milpitas, CA (US); Shivaranjani Sankara Krishnan, Sunnyvale, CA (US); Anand Parthasarathy, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 586 days.

(21) Appl. No.: 13/839,969

(22) Filed: Mar. 15, 2013

(65) Prior Publication Data

US 2014/0269432 A1 Sep. 18, 2014

(51) Int. Cl.
*H04L 12/28* (2006.01)
*H04L 12/931* (2013.01)
*H04L 12/24* (2006.01)

(52) U.S. Cl.
CPC .......... *H04L 49/354* (2013.01); *H04L 41/0803* (2013.01); *H04L 41/0846* (2013.01); *Y02B 60/43* (2013.01)

(58) Field of Classification Search
CPC ........ H04W 8/00; H04W 16/02; H04W 28/00
See application file for complete search history.

(56) References Cited

U.S. PATENT DOCUMENTS

| | | | | |
|---|---|---|---|---|
| 5,689,706 A * | 11/1997 | Rao | ............................ | G06F 9/52 |
| 8,401,026 B2 * | 3/2013 | Raman | .................... | H04L 45/00 370/396 |
| 2005/0198371 A1 * | 9/2005 | Smith | ..................... | H04L 45/02 709/238 |
| 2009/0168768 A1 * | 7/2009 | Chiabaut | ................. | H04L 45/00 370/389 |
| 2010/0290472 A1 * | 11/2010 | Raman | ..................... | H04L 45/00 370/395.2 |
| 2011/0032945 A1 * | 2/2011 | Mullooly | ................ | H04L 45/58 370/401 |
| 2011/0274114 A1 * | 11/2011 | Dhar | ....................... | H04L 49/70 370/401 |
| 2011/0280572 A1 * | 11/2011 | Vobbilisetty | ............ | H04L 49/70 398/45 |
| 2011/0299536 A1 * | 12/2011 | Cheng | ................. | H04L 12/4625 370/392 |
| 2011/0310729 A1 * | 12/2011 | Raman | ................ | G06F 11/2007 370/225 |
| 2012/0233492 A1 * | 9/2012 | Finn | ...................... | H04L 45/586 714/4.1 |
| 2013/0148654 A1 * | 6/2013 | Sayani | .................... | H04L 49/70 370/389 |
| 2015/0172184 A1 * | 6/2015 | DeSanti | .................. | H04L 45/72 370/392 |

* cited by examiner

*Primary Examiner* — Faruk Hamza
*Assistant Examiner* — Shah R Zaman
(74) *Attorney, Agent, or Firm* — Patterson & Sheridan LLP (57) ABSTRACT

Techniques for configuring a virtual network device are provided. Embodiments identify a network device profile specifying a virtual link teaming domain. Upon receiving a network message advertising the virtual link teaming domain from a peer network device of the two or more network devices, on a plurality of links of the first network device, the plurality of links are teamed, based on the virtual link teaming domain, to create a first link bundle. Embodiments advertise a virtual link teaming identifier to a neighboring network device of the first network device. Here, the neighboring network device is configured to use the virtual link teaming identifier to bundle links between the neighboring network device and the virtual network device.

18 Claims, 8 Drawing Sheets

VPC AUTO CONFIGURATION

TECHNICAL FIELD

Embodiments presented in this disclosure generally relate to virtualization, and more specifically to techniques for configuring a virtual port channel across two or more network devices.

BACKGROUND

Data communication in a computer network involves the exchange of data between two or more entities interconnected by communication links and sub-networks. A local area network (LAN) is an example of a sub-network that provides relatively short-distance communication among the interconnected stations. In contrast, a wide area network (WAN) facilitates long-distance communication over links provided by public or private telecommunications facilities. The entities are typically software programs executing on hardware computer platforms which, depending on their roles within the network, may serve as end stations or intermediate stations. Examples of intermediate stations include routers, bridges and switches that interconnect communication links and sub-networks, whereas an end station may be a computer located on one of the sub-networks. More generally, an end station connotes a source of or target for data that typically does not provide routing or other services to other computers on the network.

End stations typically communicate by exchanging discrete packets or frames of data according to predefined protocols. In this context, a protocol represents a set of rules defining how the stations interact with each other to transfer data. The traffic flowing into a network device—e.g., a router, switch, bridge, server, and the like—is generally made up of multiple abstraction layers (e.g., the Open Systems Interconnection (OSI) model). Each of these logical layers generally relates to communications functions of a similar nature. For instance, layer 2 of the OSI model is known as the data link layer and uses physical addressing (e.g., Media Access Control (MAC) addresses) for switching traffic. Layer 2 encapsulation generally provides the mechanism for transferring data between network entities, and can also be used for error correction for layer 1. As another example, layer 3 traffic is known as network layer traffic and uses logical addressing (e.g., Internet Protocol (IP) addresses) for routing traffic. Layer 3 encapsulation generally provides the mechanism for transmitting data between a source host on a first network to a destination host located on a second network.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION OF EXAMPLE EMBODIMENTS

Overview

Embodiments provide a method, network device and computer program product for configuring a virtual network device comprising two or more network devices, at a first network device of the two or more network devices. The method, network device and computer program product include identifying a network device profile specifying a virtual link teaming domain. Additionally, the method, network device and computer program product include, upon receiving a network message advertising the virtual link teaming domain from a peer network device of the two or more network devices, on a plurality of links of the first network device, teaming the plurality of links to create a first link bundle, based on the virtual link teaming domain. The method, network device and computer program product also include advertising a virtual link teaming identifier to a neighboring network device of the first network device, wherein the neighboring network device is configured to use the virtual link teaming identifier to bundle links between the neighboring network device and the virtual network device.

Example Embodiments

Generally speaking, a network device (e.g., a network switch) is a computer device that connects network segments. A network device may operate at one or more layers including, for example, the physical layer, the data link layer, the network layer, and/or the transport layer. While four layers are described, it is to be appreciated that in different examples a switch may operate at all seven layers of the Open Systems Interconnection (OSI) stack. For instance, a network device may inspect data packets as they are received. In doing so, the network device may determine the source and destination of a packet and may forward it accordingly. Additionally, a network device may contain some intelligence beyond examine and forward logic. This intelligence facilitates having a network device perform some management functions. For example, a network device could selectively turn some port range on or off, may selectively establish and/or maintain priority settings for ports, may perform media access control (MAC) filtering to prevent MAC flooding, may use a spanning tree protocol, may perform link aggregation, and so on. Typically, when these management functions are performed, they are performed in actual (e.g., physical) network devices.

Generally, network devices are interconnected by communication links for transmitting data packets through physical ports. In order to provide increased network reliability, redundant switches (and links) are often included in a network. In the event that a switch (or link) fails, a redundant switch (or link) already in place within the network can quickly be enabled to replace the failed switch (or link). Since the redundant switch or link can typically be enabled as a replacement more quickly than the failed component can be replaced or repaired, having redundant links and/or switching provides a more reliable network.

Additionally, in order to provide redundancy or bandwidth, some networks bundle multiple physical links to operate as a single virtual link or logical channel. Such a group of physical links in the virtual link is referred to herein as a port-channel, a link aggregation bundle, and a link bundle. A number of protocols may be used to bundle two or more physical links or ports together to form a single logical channel. Examples of these protocols include Port Aggregation Protocol (PAgP) and IEEE 802.1AX Link Aggregation Control Protocol (LACP). These protocols are referred to generally herein as link aggregation protocols and it is to be understood that other protocols may be used without departing from the scope of the embodiments.

To further improve network reliability, two or more network devices may be grouped (or bundled) together into a single logical network device. In such an embodiment, the grouped network devices generally function as a single virtual network device. Moreover, such a virtual network device (e.g., a virtual switch) may appear to the network devices in the network to be a single network device. Examples of protocols for bundling network devices include, without limitation, virtual port channel (vPC) and virtual switching system (VSS). Additionally, the network devices within the virtual network device communicate via one or more links (referred to herein as inter-switch links).

For example, in a network system configured according to the VSS protocol, two chassis-type layer 3 switches (hereinafter referred to as a physical switch) can be operated as one virtual switch (hereinafter a virtual switch). In such an example, a control plane (e.g., for performing the apparatus control and the protocol process) of two physical switches may be divided into active and standby, and a data plane (e.g., for performing the packet forwarding) for either could be used in the active state.

Although there are numerous advantages of network device teaming (e.g., a virtual switch created according to the vPC protocol), there are challenges as well. For instance, configuring such a virtual switch is currently a relatively involved manual process that can be time consuming and potentially error prone. These challenges can be particularly pronounced when configuring adjacent virtual switches, where all of the links connecting the adjacent virtual switches are bundled together (e.g., in a single port-channel).

As such, embodiments provide techniques for configuring a virtual network device are provided, where the virtual network device includes at least two physical network devices. For example, in one embodiment, techniques for configuring a virtual switch created according to the vPC protocol are provided. Embodiments identify a network device profile specifying a virtual link teaming domain. For instance, the network device profile could be a vPC profile (e.g., an XML file) that is copied to a physical network device, and that specifies a vPC domain for use in configuring a virtual switch from the physical network device and one or more peer network devices.

According to embodiments described herein, the network device profile could be copied to each physical network device to be included in the virtual network device. Upon identifying the network device profile, embodiments could transmit one or more network messages advertising the specified virtual link teaming domain. For instance, upon identifying the network device profile, embodiments could broadcast an advertisement specifying the virtual link teaming domain on all of the links of the network device. Thus, where the network device profile is copied to each of the physical network devices to be included in the virtual network device, each of the physical network devices could identify its respective copy of the profile and could advertise the virtual link teaming domain specified in the profile to all of the neighboring network devices.

Likewise, each of the network devices may receive an advertisement from each neighboring network device configured with a network device profile. Upon receiving a network message advertising the virtual link teaming domain from a peer network device of the two or more network devices, on a plurality of links of the first network device, embodiments could bundle the plurality of links, based on the virtual link teaming domain, to create a first link bundle. Generally, and without limitation, such a link bundle may be used for various control plane purposes, including load balancing and keep alive data between the physical network devices within the virtual network device. For instance, assume that a first physical switch is configured with a network device profile specifying a vPC domain of "ABC." In such an example, logic on the first physical switch could detect that advertisements specifying the vPC domain of "ABC" were received (i.e., from a neighboring network device also configured with a network device profile specifying the vPC domain of "ABC") on a set of links on the first physical switch. Logic on the first physical switch could then bundle the set of links into a port-channel having an identifier of "ABC." In one embodiment, the port-channel is then configured as a MultiChassis Trunk (MCT).

In addition to configuring the links between the physical network devices within the virtual network device, embodiments also configure the links between the physical network devices and their common neighboring network devices. That is, as the physical network devices are being configured to appear and function as a single virtual network device, their common neighboring network devices may be configured to treat the physical network devices as a single virtual network device. For instance, embodiments advertise a virtual link teaming identifier to a neighboring network device of the first network device. Here, the neighboring network device could be configured to use the virtual link teaming identifier to bundle links between the neighboring network device and the virtual network device into a single common port-channel. Advantageously, doing so allows the neighboring network device to treat the physical network devices within the virtual network device as a single entity, and also may provide for load balancing and redundancy between neighboring network device and the virtual network device.

Figure 1:
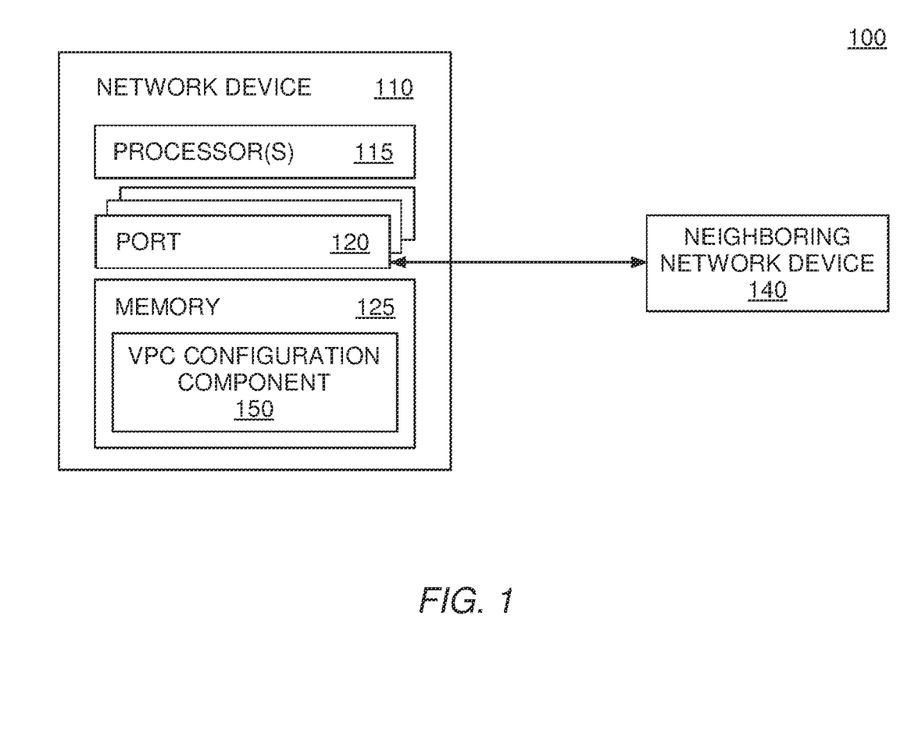
FIG. 1 illustrates a network device configured with a vPC configuration component, according to one embodiment described herein.

FIG. 1 illustrates a network device configured with a vPC configuration component, according to one embodiment described herein. As shown, the environment 100 includes a network device 110 and a neighboring network device 140. The network device 110 includes a processor 115, communication ports 120, and memory 125. The processor 115 may be any processing element capable of performing the functions described herein. The processor 115 represents a single processor, multiple processors, a processor with multiple cores, and combinations thereof. The memory 125 may be either volatile or non-volatile memory and include, RAM, flash, cache, disk drives and the like. Additionally, the memory 125 contains a vPC configuration component 150. As discussed above, the vPC configuration component 150 is generally configured to automatically configure the network device 110 and one or more other network devices (e.g., the neighboring network device 140) to appear and behave as a single, virtual network device. Moreover, the memory 125 could also contain network logic—e.g., a content addressable memory—for forwarding data in a communication network. The device 110 may also include a control plane for configuring and managing the forwarding logic.

Figure 2A:
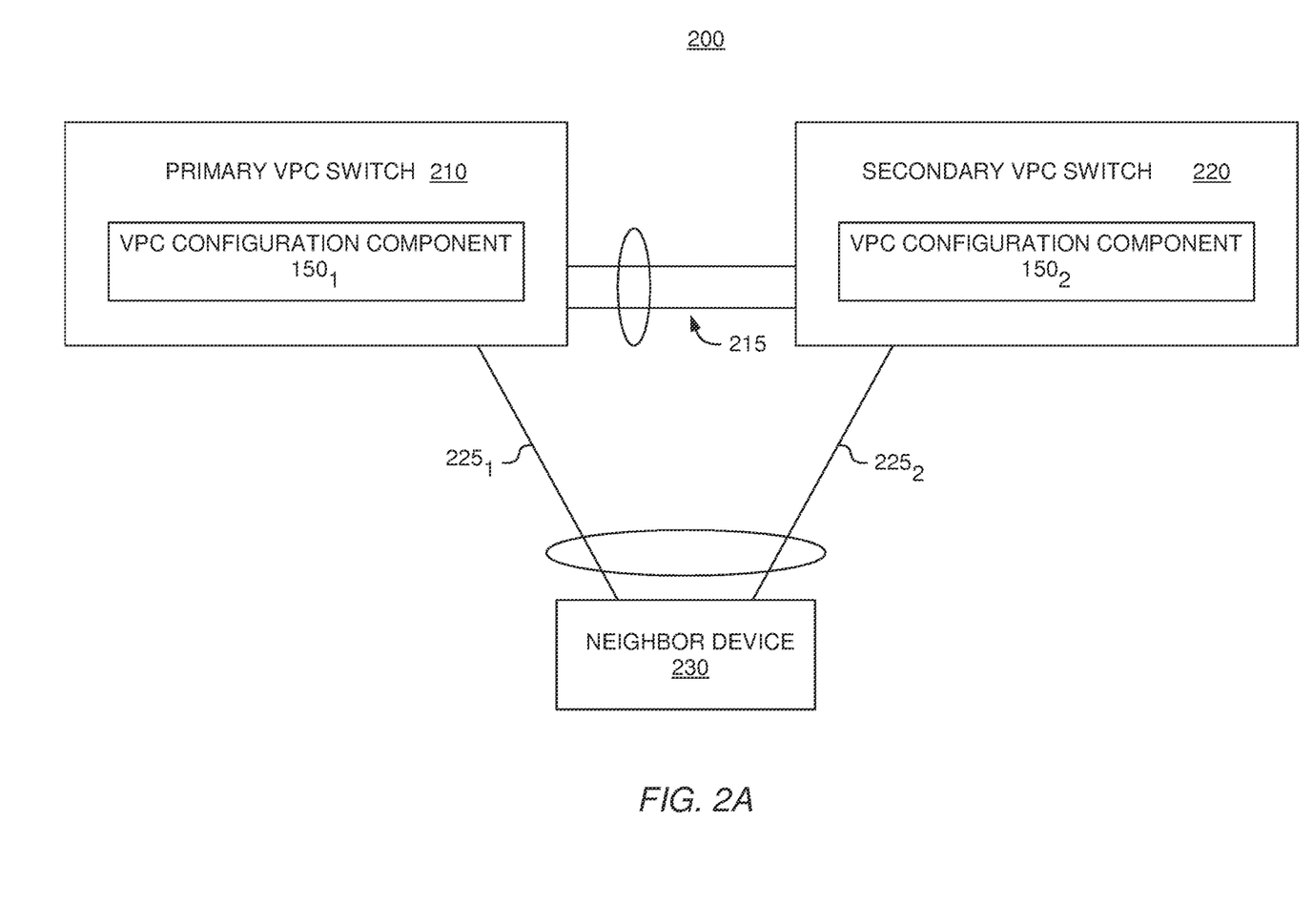
FIGS. 2A-B illustrate environments including network devices configured with vPC configuration components, according to embodiments described herein.
Figure 2B:
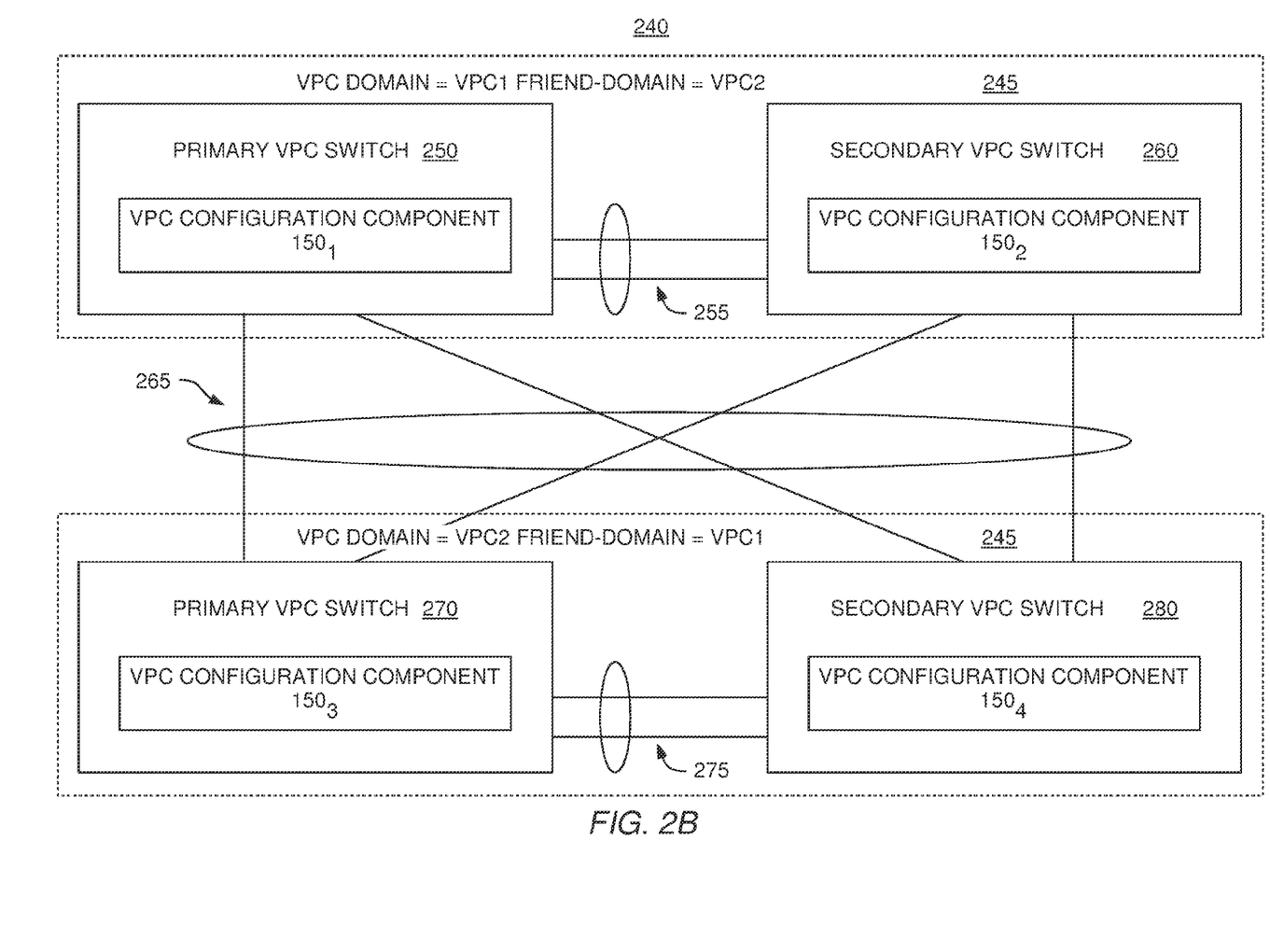

FIGS. 2A-B illustrate environments including network devices configured with vPC configuration components, according to embodiments described herein. As shown, FIG. 2A depicts a network environment 200 including a primary vPC switch 210, a secondary vPC switch 220, and a neighbor network device 230. Here, each of the primary vPC switch 210 and the second vPC switch 220 is configured with a respective vPC configuration component $150_{1-2}$. Generally, the vPC configuration components $150_{1-2}$ are configured to configure the vPC switches 210 and 220 to operate as a single virtual network switch, and to appear as a single virtual network switch from the neighboring network device's 230 perspective.

For instance, the vPC configuration components $150_{1-2}$ could identify a network device profile (not shown) on each of the network devices 210 and 220. Generally, the network device profile could specify a virtual link teaming domain (e.g., a vPC domain) for use in configuring the virtual network device. As an example, the switch profile could contain a "vPC_profile" section, while specifies a "vPC_domain" value. For purposes of this example, assume that both the primary vPC switch 210 and the secondary vPC switch 220 are configured with a switch profile that specifies a "vPC_domain" value of "ABC". Upon detecting the switch profiles, the vPC configuration components $150_{1-2}$ could transmit an advertisement on all ports of the switches 210 and 220, specifying the "vPC_domain" value within the profile.

For each of the vPC configuration components $150_{1-2}$, upon receiving a network message advertising the virtual link teaming domain from the peer network device, the vPC configuration components $150_{1-2}$ could determine that the received advertisements specify a "vPC_domain" value that matches the "vPC_domain" value within their respective switch profiles. Additionally, the vPC configuration components $150_{1-2}$ could determine a plurality of links 215 on each of the switches 210 and 220 on which the advertisement was received. The vPC configuration component $150_{1-2}$ could then bundle the plurality of links 215 to create a first link bundle. As an example, the vPC configuration components $150_{1-2}$ could create a port-channel using the determined links 215, and could assign the port-channel an identifier corresponding to the "vPC_domain" value specified within the profile. Generally, such a link bundle can be used for inter-switch communications within the virtual switch, such as load balancing and other control plane functions. One example of such a bundle is a Multi-Chassis Trunk (MCT).

In addition to configuring the link bundle between the physical switches 210 and 220 within the virtual switch, the vPC configuration components $150_{1-2}$ may also configure the adjacent neighboring network device 230 to communicate with the virtual switch. For instance, the vPC configuration components $150_{1-2}$ could elect one of the vPC configuration components $150_{1-2}$ as a primary vPC configuration component, and the primary vPC configuration component could then create an identifier to advertise to the neighboring network device 230. In one embodiment, the vPC configuration components $150_{1-2}$ are configured to apply a tie breaking algorithm to select the primary vPC configuration component. For purposes of this example, assume that the vPC configuration component $150_1$ on the primary vPC switch 210 is determined to be the primary vPC configuration component.

Once the primary vPC configuration is determined, the primary vPC configuration component could then determine the identifier to advertise to the neighboring network device 230, and the vPC configuration components $150_{1-2}$ could advertise the determined identifier across all of the links of the switches 210 and 220. In one embodiment, the vPC configuration components $150_{1-2}$ are configured to only broadcast the determined identifier across links that are not part of the link bundle between the switches 210 and 220. That is, knowing that the bundled links between the switches 210 and 220 are inter-switch links within the virtual switch, the vPC configuration components $150_{1-2}$ could avoid broadcasting the determined identifier on these links.

Here, the neighboring network device could be configured with logic to use the determined identifier to bundle links $225_{1-2}$ between the neighboring network device and the virtual network device (i.e., the primary vPC switch 210 and the secondary vPC switch 220, in this example). For instance, the neighbor network device 230 could be configured to create a port-channel including the links $225_{1-2}$, and to use the created port-channel to communicate with the virtual network device. Advantageously, doing so allows the virtual network device to appear and behave as a single virtual network device from the perspective of the neighbor network device 230, and further allows the neighbor network device 230 to communicate with the virtual network device accordingly.

In one embodiment, the vPC configuration components $150_{1-2}$ are configured to automatically enabling one or more link teaming-related services on the respective switch 210 and 220, responsive to identifying the network device profile specifying the virtual link teaming domain. For example, upon detecting that the switch profile on the switch 210 contains a "vPC_profile" section, the vPC configuration component $150_1$ could automatically enable vPC functionality, link layer discovery protocol (LLDP) functionality and link aggregation control protocol (LACP) functionality on the switch 210.

Additionally, the vPC configuration components $150_{1-2}$ could configure peer keepalive links for the MCT 215 between the switches 210 and 220. Generally, such peer keepalive links can be used to detect communication problems between the switches 210 and 220, by periodically transmitting heartbeat messages between the switches 210 and 220. In configuring the peer keepalive links, the vPC configuration components $150_{1-2}$ could identify network address information associated with their respective switches 210 and 220, and could transmit this information to the other the vPC configuration components $150_{1-2}$ across the MCT 215. The vPC configuration components $150_{1-2}$ could then use the received network address information to configure the peer keepalive links on the switches 210 and 220. In one embodiment, the switch profile contains additional peer keepalive configuration information.

In a particular embodiment, the vPC configuration components $150_{1-2}$ are also configured to detect any subsequently connected links between the switches 210 and 220, and to add these links to the MCT 215. For example, whenever a new link is connected on the switches 210 and 220, the vPC configuration components $150_{1-2}$ could transmit an advertisement containing the vPC domain specified in the switch profile across the new link. Upon receiving an advertisement specifying the vPC domain specified in the corresponding switch profile, the vPC configuration components $150_{1-2}$ could add the link on which the advertisement was received to the link bundle 215. Advantageously, doing so enables the vPC configuration components $150_{1-2}$ to automatically configure any subsequently connected links between the switches 210 and 220.

FIG. 2B illustrates a second example of a network configured a vPC configuration component. As shown, the network 240 includes two virtual switches 245 and 285, having vPC domains of "vPC1" and "vPC2", respectively, and interconnected by a plurality of links 265. Here, the virtual switch 245 includes physical switches 250 and 260, and the virtual switch 285 includes physical switches 270 and 280. The virtual switch 245 includes a bundle of links 255 configured to act as a MCT for the virtual switch 245. Likewise, the virtual switch 285 includes a bundle of links 275 configured to act as a MCT for the virtual switch 285. In this example, each of the physical switches 250, 260, 270 and 280 is configured with a respective vPC configuration component $150_{1-4}$.

Generally, the vPC configuration components $150_{1-2}$ are configured to create and configure the virtual switch 245, and the vPC configuration components $150_{3-4}$ are configured to create and configure the virtual switch 285. For instance, the vPC configuration components $150_{1-2}$ could retrieve switch profiles on the physical switch 250 and 260 and could determine that these switch profiles specify a vPC domain of "vPC1". The vPC configuration components $150_{1-2}$ could then advertise their vPC domain of "vPC1" across all of their links, and could identify adjacent switches having the same vPC domain based on the advertisements the vPC configuration components $150_{1-2}$ each receive. The vPC configuration components $150_{1-2}$ could then bundle the links 255 (i.e., the links on which advertisements specifying the same vPC domain as the switch profile were received) into a port-channel, for inter-switch communications within the virtual switch 245. The vPC configuration components $150_{3-4}$ could perform similar actions to create the virtual switch 285, having the vPC domain of "vPC2".

Additionally, in this example, the switch profile for the physical switches 250 and 260 specifies a "friend_domain" value of "vPC2". That is, since the depicted system 240 includes two adjacent virtual switches 245 and 285, the vPC configuration components $150_{1-4}$ may be configured to perform several additional actions in order to properly configure the network environment. For instance, the vPC configuration component $150_1$ could retrieve a neighbor information database from the secondary vPC switch 260. One example of such a neighbor database is an LLDP neighbor database. The vPC configuration component $150_1$ could then use the neighbor information database to identify links to common neighbors between the vPC switches 250 and 260. Thus, in the depicted example, the vPC configuration component $150_1$ could determine the plurality of links 265, between the virtual network devices 245 and 285.

Furthermore, one of the vPC configuration components $150_{1-4}$ could then determine an identifier for use in bundling the plurality of links 265. For instance, a tie-breaking algorithm could be used to select one of the vPC configuration components $150_{1-4}$ as a primary vPC configuration component, and the primary vPC configuration component could then determine a unique identifier for use in bundling the plurality of links 265. The primary vPC configuration component could transmit such an identifier to each of the other vPC configuration components $150_{1-4}$, which could then bundle the links 265 on each of the switches 250, 260, 270 and 280 (e.g., into a port-channel). Advantageously, doing so ensures that the vPC configuration components $150_{1-4}$ properly configure the network environment, even when two virtual switches are adjacent to one another.

Figure 3:
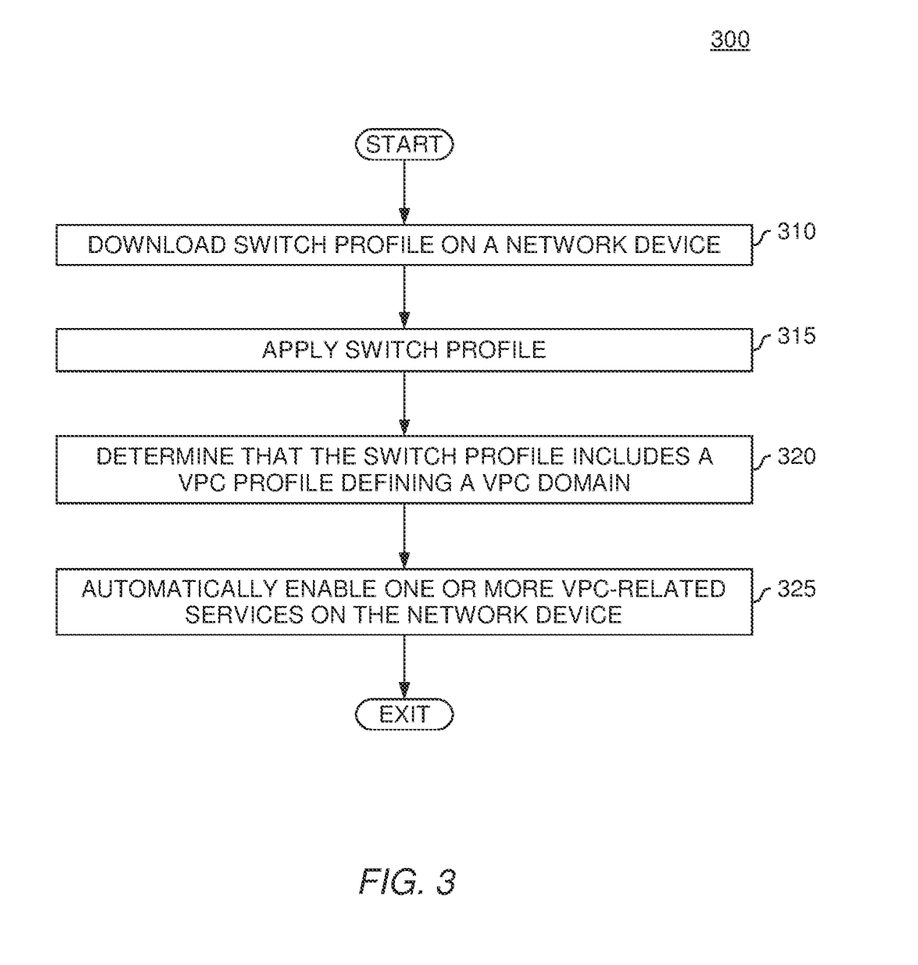
FIG. 3 is a flow diagram illustrating a method for automatically configuring a network device, according to one embodiment described herein.

FIG. 3 is a flow diagram illustrating a method for automatically configuring a network device, according to one embodiment described herein. As shown, the method 300 begins at block 310, where a vPC configuration component 150 downloads a switch profile onto a network device. Generally, such a switch profile may be transmitted to the network device in any number of different ways and across any number of different communication mechanisms. Additionally, and without limitation, the downloading of the switch profile can be a manual operation (e.g., initiated by a network administrator of the network device) or an automatic operation (e.g., a switch profile pushed out to the network device from a server, a switch profile automatically downloaded from the server by the network device, etc.). Upon receiving the switch profile, the vPC configuration component 150 applies the switch profile on the network device (block 315). Generally, such an application may include one or more configuration operations on the network device.

The vPC configuration component 150 then determines that the switch profile includes a vPC profile defining a vPC domain (block 320). For example, the switch profile could be an XML document that defines a "vPC_domain" value within a "vPC_profile" section. More generally, it is broadly contemplated that any format of switch profile may be used, in accordance with embodiments described herein.

Additionally, the vPC configuration component 150 automatically enables one or more vPC-related services on the network device, and the method 300 ends. Examples of such services include vPC functionality, LLDP functionality and LACP functionality. More generally, any service having an association with vPC configuration and/or creation may be enabled by the vPC configuration component 150. Advantageously, doing so ensures that the proper services are enabled on the network device, so that the virtual switch configuration can complete successfully.

Figure 4:
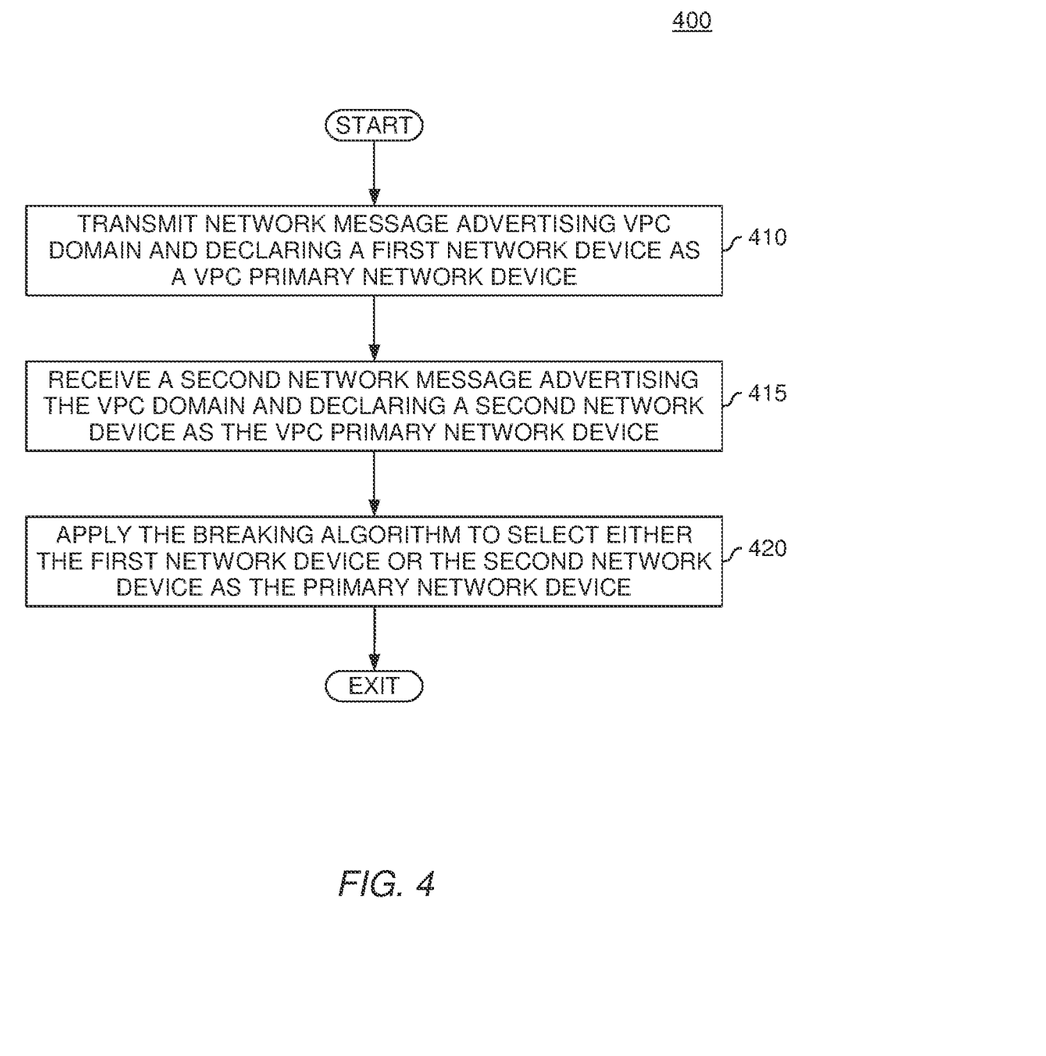
FIG. 4 is a flow diagram illustrating a method for electing a primary network device, according to one embodiment described herein.

FIG. 4 is a flow diagram illustrating a method for electing a primary network device, according to one embodiment described herein. As shown, the method 400 begins at block 410, where the vPC configuration component 150 on a first network device transmits a network message advertising the vPC domain specified in the switch profile. Additionally, in this example, the transmitted message declares the first network device to be a vPC primary network device.

Likewise, a second network message advertising the vPC domain and declaring a second network device to be the vPC primary network device is received (block 415). Thus, in the depicted examples, each of the vPC configuration components 150 is configured to declare themselves as a primary, which in turn initiates a primary election process to select only one of the vPC configuration components 150 as the primary vPC configuration component. For example, a tie-breaking algorithm could be employed to select only one of the vPC configuration components 150 as the primary vPC configuration component (block 420), and the method 400 ends. The primary vPC configuration component could then be used, for instance, for assigning a vPC identifier for a common neighboring network device for the physical network devices within the virtual switch. The physical network devices could then advertise the assigned vPC identifier (e.g., across all of their ports) and the common neighboring network device could bundle all links on which the vPC identifier was received into a single link bundle. Thus, by advertising the assigned vPC identifier, the common neighboring network device can identify its links that connect to the virtual switch (i.e., its links that connect to any of the physical switches within the virtual switch).

Figure 5:
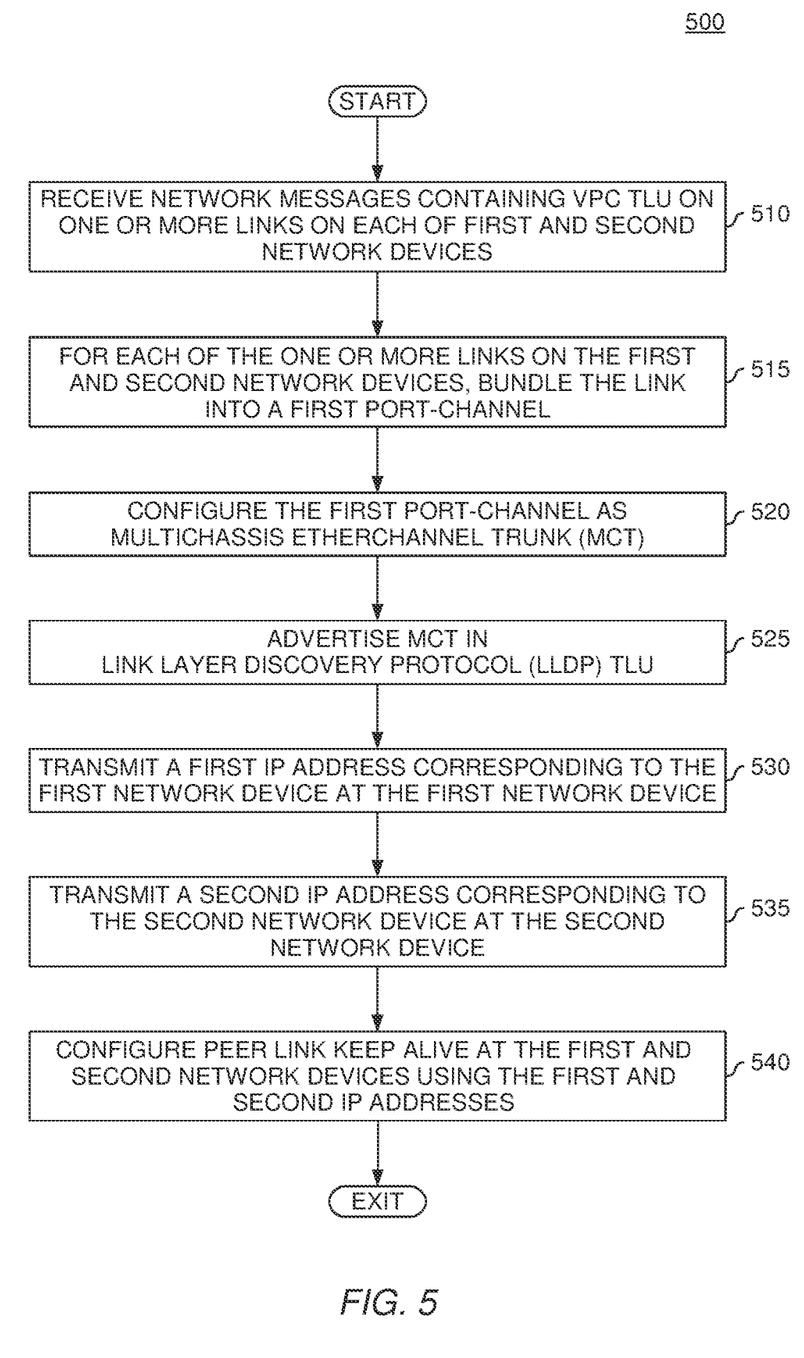
FIG. 5 is a flow diagram illustrating a method for configuring resource teaming across two network devices, according to one embodiment described herein.

FIG. 5 is a flow diagram illustrating a method for configuring resource teaming across two network devices, according to one embodiment described herein. As shown, the method 500 begins at block 510, where the vPC configuration component 150 receives network messages containing a Link Layer Discovery Protocol (LLDP) TLV containing a Multi-chassis Ethernet Trunk (MCT) TLV, with a value of the vPC domain, on one or more links of each of a first and second network device. That is, as discussed above, upon detecting a vPC domain specified within the corresponding switch profile, the vPC configuration component 150 on each of the network devices may advertise the vPC domain on all links of the network device. Doing so allows the physical switches that are to be included within the virtual switch to initially identify one another.

The vPC configuration components 150 on the first and second network devices then bundle together all of the links on which the vPC domain advertisement was received into a first port-channel (block 515). While the vPC configuration component 150 is configured to bundle the links into a single port-channel in the present example, it is broadly contemplated that any technique for bundling the links into a single logical link may be used, consistent with the functionality described herein. Additionally, the vPC configuration component 150 configures the first port-channel to act as a MCT for the virtual switch (block 520). As discussed above, the MCT may be configured (e.g., using LACP) for use in, for example and without limitation, load balancing and other control plane functionality between the first and second network devices.

Although the MCT is used for inter-switch communications within the virtual switch, the links to common neighboring network devices may also be configured, so that the virtual switch functions and appears as a single network device to the neighboring network devices. Thus, in the depicted embodiment, once the MCT is created, the vPC configuration component 150 advertises the MCT in an LLDP TLV (block 525). The neighboring network devices could be configured with logic to determine a number of links over which the LLDP TLV specifying the MCT is received, and to bundle these links (e.g., into a second port-channel). Advantageously, doing so allows the neighboring network devices to communicate with the virtual switch, as if the virtual switch is a single network device.

Returning to the depicted embodiment, the vPC configuration component 150 on the first network device transmits a first IP address corresponding to the first network device across the MCT (block 530). Likewise, the vPC configuration component 150 on the second network device transmits a second IP address corresponding to the second network device across the MCT (block 535). For example, the vPC configuration components 150 could retrieve the IP address from a management cell of an information database (e.g., an LLDP database) on the corresponding network device. The vPC configuration component 150 then configures a peer keepalive link at the first and second network devices, using the first and second IP addresses (block 540), and the method 500 ends. As discussed above, the peer keepalive link may be used to transmit periodic heartbeat messages, in order to detect when communication problems arise between the first and second network devices.

Figure 6:
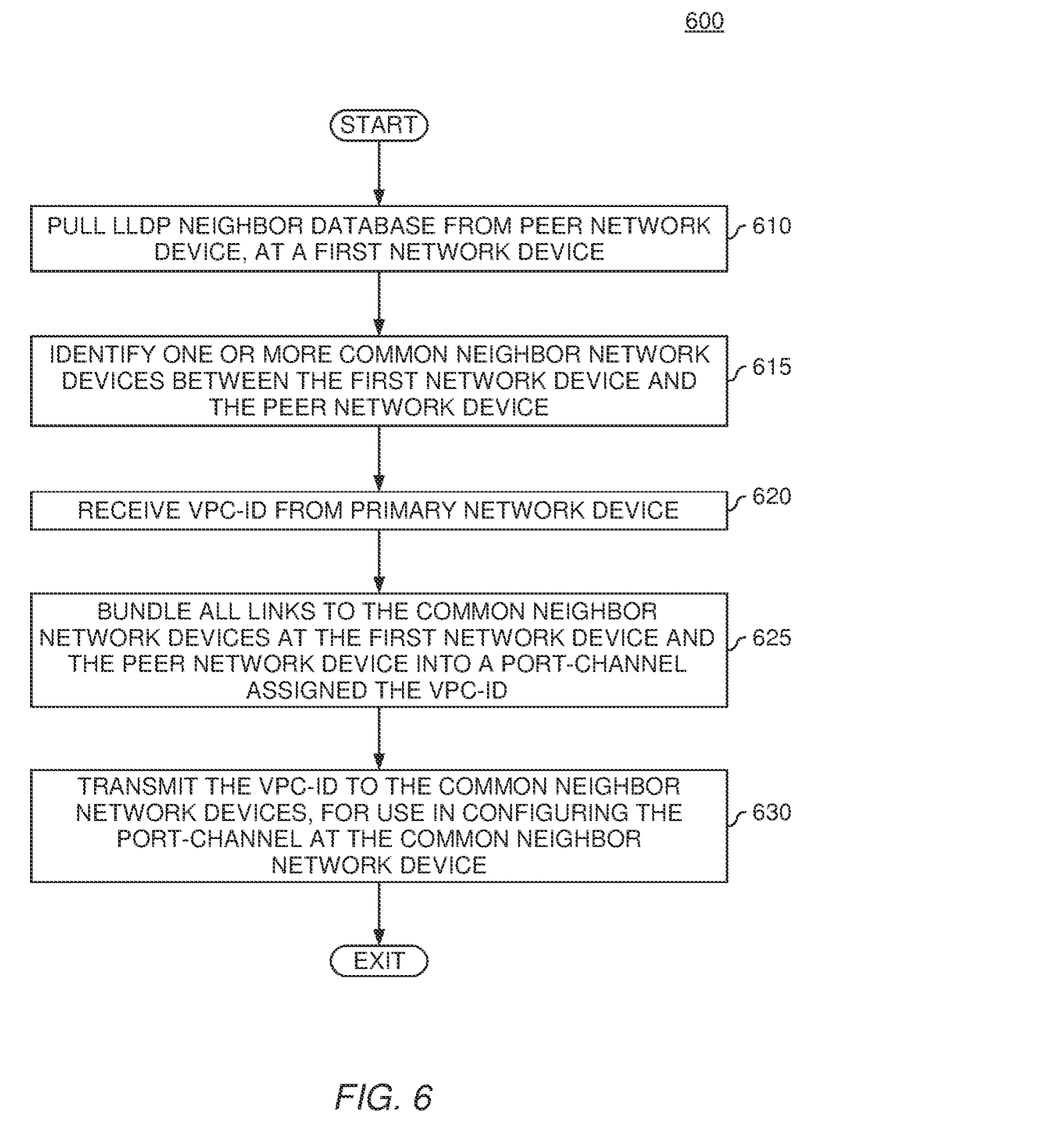
FIG. 6 is a flow diagram illustrating a method for configuring resource teaming across two network devices, according to one embodiment described herein.

Once the MCT is configured between the physical network devices within the virtual network device, the links to the neighboring network devices and the neighboring network devices themselves may be configured to recognize the virtual network device as a single network device. FIG. 6 is a flow diagram illustrating a method for configuring resource teaming across two network devices, according to one embodiment described herein. As shown, the method 600 begins at block 610, where the vPC configuration component 150 running on a first network device pulls an LLDP neighbor database from a peer network device. The vPC configuration component 150 then identifies a plurality of links to one or more common neighbor network devices between the first network device and the peer network device (block 615). Generally, a common neighbor network device refers to any network device to which both the first network device and the peer network device are directly connected. For example, the vPC configuration component 150 could compare the retrieved LLDP neighbor database from the peer network device with a local LLDP neighbor database on the first network device, in order to identify the common neighboring network devices.

The vPC configuration component 150 then receives a vPC-ID from a primary network device (block 620). In one embodiment, the vPC-ID is received using the Cisco Fabric Services (CFS) protocol. As discussed above, a tie-breaking algorithm could be employed to select one of the first network device and the peer network device as the primary network device. The vPC configuration component 150 then bundles the plurality of links (determined in block 615) into a single port-channel that is assigned the received vPC-ID (block 625). Additionally, the vPC configuration component 150 transmits the vPC-ID to each of the common neighboring network devices, for use in configuring the other end of the port-channel (block 630), and the method ends. Advantageously, doing so helps to ensure that the virtual network device will function as a single logical network device and will appear as such to its neighboring network devices. In one embodiment, the vPC configuration component 150 transmits the vPC-ID to the common neighboring network devices using a vPC TLV within a LLDP TLV.

Figure 7:
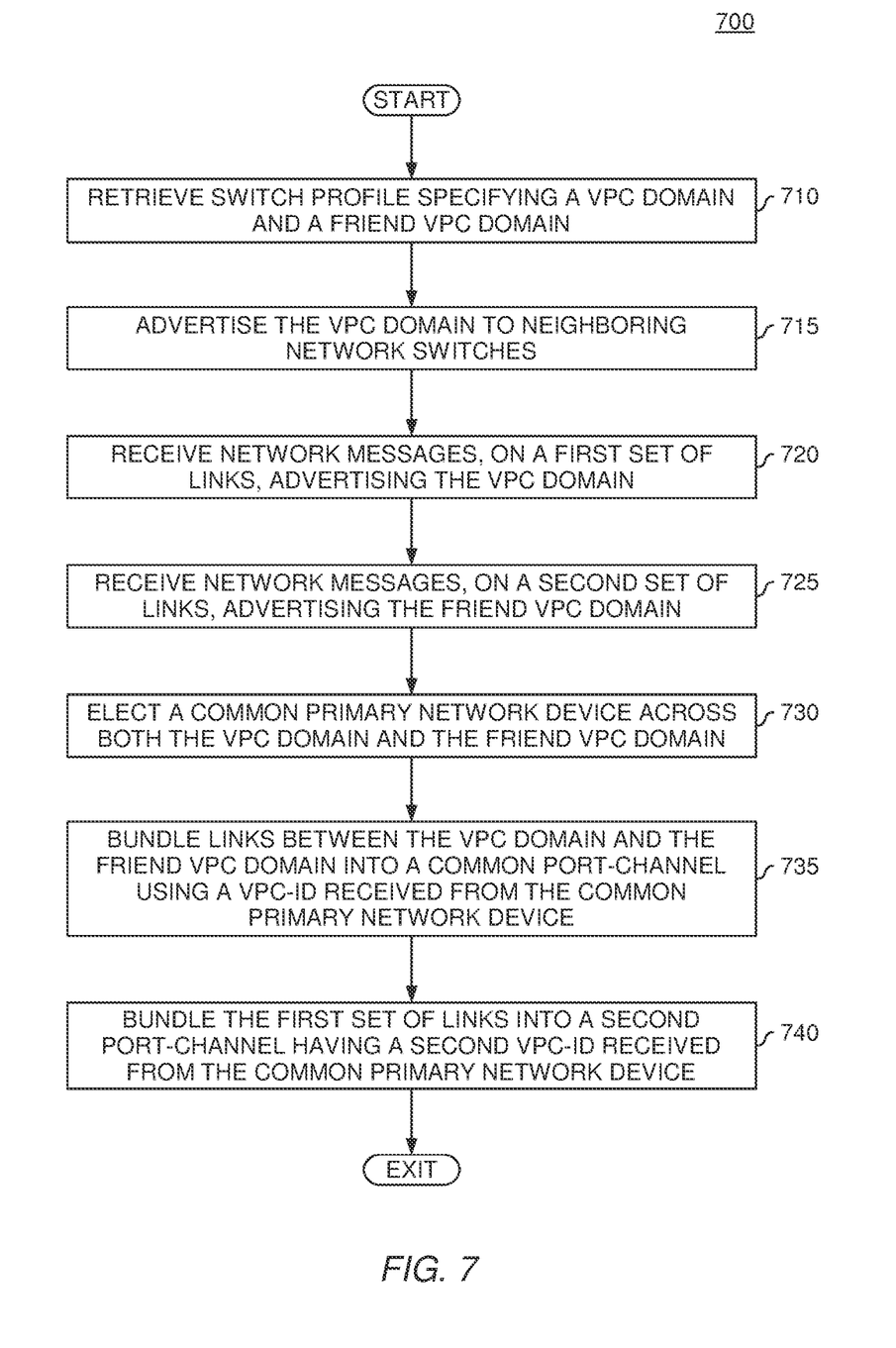
FIG. 7 is a flow diagram illustrating a method for configuring resource teaming across two network devices, according to one embodiment described herein.

As discussed above, there can be some additional challenges in configuring adjacent virtual switches, such as the virtual switches depicted in the FIG. 2B and discussed above. An example of such a configuration is shown in FIG. 7, which is a flow diagram illustrating a method for configuring resource teaming across two network devices, according to one embodiment described herein. As shown, the method 700 begins at block 710, where the vPC configuration component 150 on a first network device retrieves a switch profile specifying both a vPC domain and a friend vPC domain. Additionally, the vPC configuration component 150 advertises the specified vPC domain across all of the ports on the first network device (block 715). As discussed above, doing so enables the vPC configuration component 150 to identify adjacent network devices having the same vPC domain. More precisely, when an adjacent network device having the same vPC domain receives the advertisement from the first network device specifying the vPC domain, the vPC configuration component 150 on the adjacent network device can determine that the two network devices share a common vPC domain and should be configured into a single virtual switch having the vPC domain.

The vPC configuration component 150 on the first network device then receives a first set of network messages, on a first set of links, advertising the vPC domain (block 720). That is, just as the vPC configuration component 150 on the first network device advertises the vPC domain across its links, the adjacent network devices are also configured to advertise the vPC domain across their links. Additionally, in the depicted embodiment, the vPC configuration component 150 receives a second set of network messages, on a second set of links, advertising the friend vPC domain specified in the switch profile (block 725). For example, in the network environment 240 shown in FIG. 2B and discussed above, the vPC configuration component $150_1$ on the primary vPC switch 250 could receive network messages from the switches 270 and 280, advertising the vPC domain of "vPC2".

Upon receiving the second set of network messages advertising the friend vPC domain, the vPC configuration component 150 is configured to elect a common primary network device across all the network devices in the vPC domain and the friend vPC domain (block 730). For example, in the network environment 240 shown in FIG. 2B, the vPC configuration components $150_{1-4}$ could elect a single one of the vPC configuration components $150_{1-4}$ on the switches 250, 260, 270 and 280 to be the primary vPC configuration component.

The vPC configuration component 150 then bundles all of the links between the vPC domain and the friend vPC domain into a common port-channel, using a vPC identifier assigned by the elected common primary network device (block 735). For example, in the FIG. 2B, the vPC configuration component $150_1$ could be elected as the primary vPC configuration component, and could transmit the vPC identifier to the other vPC configuration components $150_{2-4}$. Each of the vPC configuration components $150_{1-4}$ could then bundle their respective ports associated with the links 265 into a port-channel having the assigned vPC identifier.

Additionally, the vPC configuration component 150 bundles the first set of links into a second port-channel, having a second vPC identifier assigned by the elected primary network device, for use as a MCT for the virtual switch (block 740). In one embodiment, the vPC configuration component 150 is configured to bundle the first set of links into the second port-channel having the vPC domain as an identifier. Once the port-channels are created, the method 700 ends.

Additionally, it is specifically contemplated that embodiments may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Cloud computing resources may be provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present disclosure, a vPC configuration component 150 could reside within the cloud, and could configure a virtual network device comprising two or more network devices within the cloud. The vPC configuration component 150 could identify a network device profile specifying a virtual link teaming domain, and upon receiving a network message advertising the virtual link teaming domain from a peer network device of the two or more network devices, on a plurality of links of the first network device, the vPC configuration component 150 could team the plurality of links to create a first link bundle, based on the virtual link teaming domain. The vPC configuration component 150 could then advertise a virtual link teaming identifier to a neighboring network device of the first network device, where the neighboring network device is configured to use the virtual link teaming identifier to bundle links between the neighboring network device and the virtual network device. Advantageously, doing so helps to ensure efficient configuration of virtual network devices in the data centers for the cloud.

While the previous discussion is directed to embodiments of the present disclosure, other and further embodiments of the disclosure may be devised without departing from the basic scope thereof. For example, aspects of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method for configuring a virtual network device comprising two or more network devices, at a first network device of the two or more network devices, the method comprising:
   identifying a network device profile specifying a virtual link teaming domain;
   upon receiving a network message advertising the virtual link teaming domain from a peer network device of the two or more network devices and declaring the peer network device to be a primary network device for the virtual network device, on a plurality of links of the first network device, teaming the plurality of links to create a first link bundle, based on the virtual link teaming domain;

while the peer network device is declared as the primary network device for the virtual network device, transmitting a second network message declaring the first network device to be the primary network device for the virtual network device, rather than the peer network device;

applying a tie breaking algorithm to elect either the peer network device or the first network device as the primary network device for the virtual network device, wherein the elected primary network device performs one or more management functions for the virtual network device;

dynamically generating a virtual link teaming identifier for the virtual network device, by the elected primary network device; and advertising, by the elected primary network device, the virtual link teaming identifier to a neighboring network device of the first network device, wherein the neighboring network device is configured to use the virtual link teaming identifier to bundle links between the neighboring network device and the virtual network device.

2. The method of claim 1, further comprising:
responsive to identifying the network device profile specifying the virtual link teaming domain, automatically enabling one or more link teaming-related services on the first network device.

3. The method of claim 1, wherein teaming the plurality of links to create a first link bundle comprises:
assigning the plurality of links to a common Port-Channel, and
wherein the virtual link teaming domain comprises a Virtual Port-Channel (vPC) domain.

4. The method of claim 1, wherein the peer network device is configured to advertise the unique vPC identifier, and wherein the neighboring network device is configured to bundle all links on which the vPC identifier is received into a single link bundle.

5. The method of claim 1, wherein the network device profile further specifies a peer virtual link teaming domain, and further comprising:
retrieving a neighbor information database from the peer network device;
determining a plurality of links, across the first network device and the peer network device, that connect to one of a plurality of common neighboring network devices shared between the first network device and the peer network device;
electing a common primary network device between the first network device, the peer network device, and the plurality of common neighboring network devices; and
teaming the plurality of links, based on an identifier assigned by the common primary network device.

6. The method of claim 1, further comprising:
configuring the first link bundle as a Multichassis EtherChannel Trunk (MCT).

7. The method of claim 6, further comprising:
configuring a peer keepalive link for the MCT, at the first network device, comprising:
receiving, from the peer network device, a second network address associated with the peer network device; and
configuring the peer keepalive link for the MCT, using the second network address; and transmitting a first network address associated with the first network device, wherein the peer network device is configured to receive the first network address and to configure a second peer keepalive link at the peer network device using the first network address.

8. The method of claim 1, wherein the network message advertising the virtual link teaming domain from a peer network device comprises a LLDP TLV that contains a MCT TLV, wherein the MCT TLV specifies the virtual link teaming domain.

9. A network device, comprising:
a processor; and
a memory containing a program that, when executed by the processor, performs an operation for a virtual network device comprising two or more network devices, wherein the network device is one of the two or more network devices, the operation comprising:
identifying a network device profile specifying a virtual link teaming domain;
upon receiving a network message advertising the virtual link teaming domain from a peer network device of the two or more network devices and declaring the peer network device to be a primary network device for the virtual network device, on a plurality of links of the first network device, teaming the plurality of links to create a first link bundle, based on the virtual link teaming domain;
while the peer network device is declared as the primary network device for the virtual network device, transmitting a second network message declaring the first network device to be the primary network device for the virtual network device, rather than the peer network device;
applying a tie breaking algorithm to elect either the peer network device or the first network device as the primary network device for the virtual network device, wherein the elected primary network device performs one or more management functions for the virtual network device;
dynamically generating a virtual link teaming identifier for the virtual network device, by the elected primary network device; and
advertising, by the elected primary network device, the virtual link teaming identifier to a neighboring network device of the first network device, wherein the neighboring network device is configured to use the virtual link teaming identifier to bundle links between the neighboring network device and the virtual network device.

10. The network device of claim 9, the operation further comprising:
responsive to identifying the network device profile specifying the virtual link teaming domain, automatically enabling one or more link teaming-related services on the network device.

11. The network device of claim 9, wherein teaming the plurality of links to create a first link bundle comprises:
assigning the plurality of links to a common Port-Channel, and
wherein the virtual link teaming domain comprises a Virtual Port-Channel (vPC) domain.

12. The network device of claim 9, wherein the peer network device is configured to advertise the unique vPC identifier, and wherein the neighboring network device is configured to bundle all links on which the vPC identifier is received into a single link bundle.

13. The network device of claim 9, wherein the network device profile further specifies a peer virtual link teaming domain, and further comprising:
retrieving a neighbor information database from the peer network device;
determining a plurality of links, across the network device and the peer network device, that connect to one of a plurality of common neighboring network devices shared between the first network device and the peer network device;
electing a common primary network device between the network device, the peer network device, and the plurality of common neighboring network devices; and
teaming the plurality of links, based on an identifier assigned by the common primary network device.

14. The network device of claim 9, the operation further comprising:
configuring the first link bundle as a Multichassis EtherChannel Trunk (MCT).

15. The network device of claim 14, the operation further comprising:
configuring a peer keepalive link for the MCT, at the network device, comprising:
receiving, from the peer network device, a second network address associated with the peer network device; and
configuring the peer keepalive link for the MCT, using the second network address;
and
transmitting a first network address associated with the network device, wherein the peer network device is configured to receive the first network address and to configure a second peer keepalive link at the peer network device using the first network address.

16. The network device of claim 9, wherein the network message advertising the virtual link teaming domain from a peer network device comprises a LLDP TLV that contains a MCT TLV, wherein the MCT TLV specifies the virtual link teaming domain.

17. A computer program product for configuring a virtual network device comprising two or more network devices, at a first network device of the two or more network devices, comprising:

computer code that identifies a network device profile specifying a virtual link teaming domain;
computer code that, upon receiving a network message advertising the virtual link teaming domain from a peer network device of the two or more network devices and declaring the peer network device to be a primary network device for the virtual network device, on a plurality of links of the first network device, teams the plurality of links to create a first link bundle, based on the virtual link teaming domain;
computer code that, while the peer network device is declared as the primary network device for the virtual network device, transmits a second network message declaring the first network device to be the primary network device for the virtual network device, rather than the peer network device;
computer code that applies a tie breaking algorithm to elect either the peer network device or the first network device as the primary network device for the virtual network device, wherein the elected primary network device performs one or more management functions for the virtual network device;
computer code that dynamically generates a virtual link teaming identifier for the virtual network device, by the elected primary network device;
computer code that advertises, by the elected primary network device, the virtual link teaming identifier to a neighboring network device of the first network device, wherein the neighboring network device is configured to use the virtual link teaming identifier to bundle links between the neighboring network device and the virtual network device; and
a computer-readable memory storing the computer codes.

18. The computer program product of claim 17,
wherein the peer network device is configured to advertise the unique vPC identifier, and
wherein the neighboring network device is configured to bundle all links on which the vPC identifier is received into a single link bundle.

* * * * *